(12) United States Patent
Hashimoto et al.

(10) Patent No.: US 6,692,440 B2
(45) Date of Patent: Feb. 17, 2004

(54) ULTRASONIC DIAGNOSTIC APPARATUS

(75) Inventors: Hiroshi Hashimoto, Tokyo (JP); Shinichi Amemiya, Tokyo (JP)

(73) Assignee: GE Medical Systems Global Technology Company, LLC, Waukesha, WI (US)

(*) Notice: Subject to any disclaimer, the term of this patent is extended or adjusted under 35 U.S.C. 154(b) by 0 days.

(21) Appl. No.: 10/246,057

(22) Filed: Sep. 18, 2002

(65) Prior Publication Data

US 2003/0060709 A1 Mar. 27, 2003

(30) Foreign Application Priority Data

Sep. 21, 2001 (JP) .......................................... 2001-287989

(51) Int. Cl.⁷ ................................................. A61B 8/00
(52) U.S. Cl. ..................................................... 600/443
(58) Field of Search ................................ 600/437–471; 73/620–633; 367/7, 11, 130, 138; 128/916

(56) References Cited

U.S. PATENT DOCUMENTS

| 5,483,964 | A |   | 1/1996  | Amemiya et al. |
| 5,490,511 | A |   | 2/1996  | Amemiya et al. |
| 5,555,514 | A |   | 9/1996  | Ri et al. |
| 5,584,294 | A |   | 12/1996 | Amemiya et al. |
| 5,615,679 | A |   | 4/1997  | Ri et al. |
| 5,782,768 | A |   | 7/1998  | Hashimoto et al. |
| 5,840,034 | A |   | 11/1998 | Amemiya et al. |
| 5,879,302 | A |   | 3/1999  | Hashimoto et al. |
| 6,120,448 | A | * | 9/2000  | Bradley et al. .............. 600/443 |
| 6,139,497 | A |   | 10/2000 | Amemiya et al. |

* cited by examiner

*Primary Examiner*—Ali M. Imam
(74) *Attorney, Agent, or Firm*—Carl B. Horton, Esq.; Armstrong Teasdale LLP

(57) ABSTRACT

For the purpose of eliminating a problem that a good harmonic image cannot be obtained due to the tail of a fundamental component of previous received data intruding into a fundamental component of current received data; in the operation in a harmonic mode according to a phase inversion technique, a first ultrasonic pulse is sequentially transmitted to a plurality of foci on the same acoustic line, and a second ultrasonic pulse of a phase opposite to that of the first ultrasonic pulse is sequentially transmitted to the plurality of foci on the same acoustic line.

18 Claims, 11 Drawing Sheets

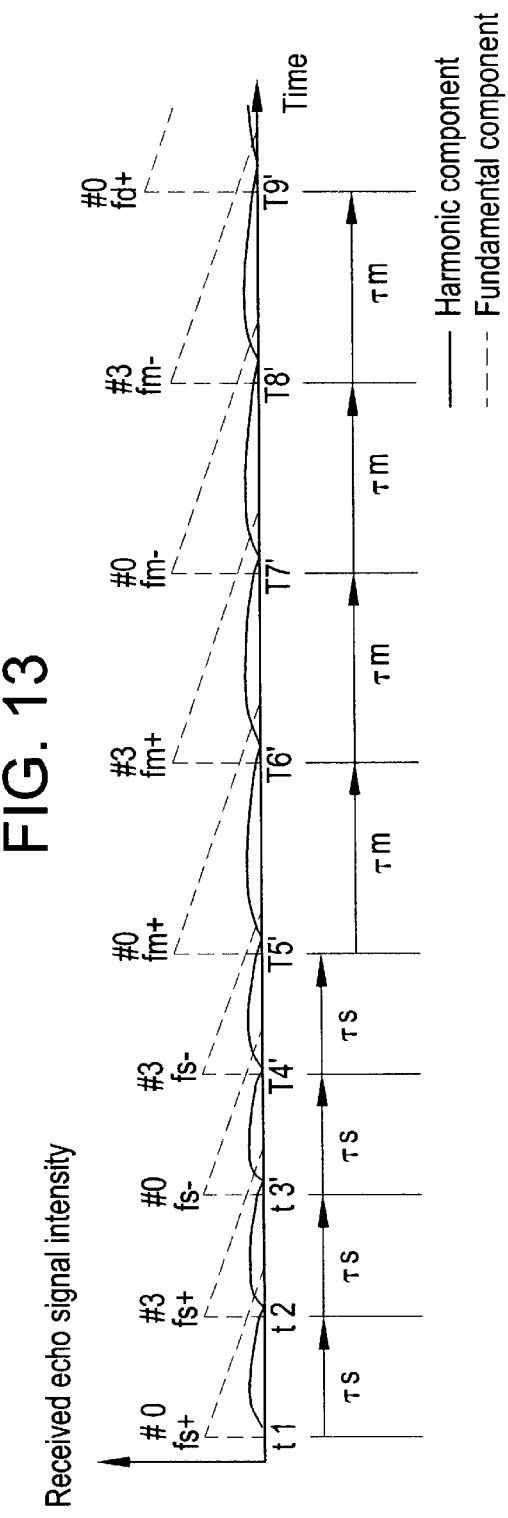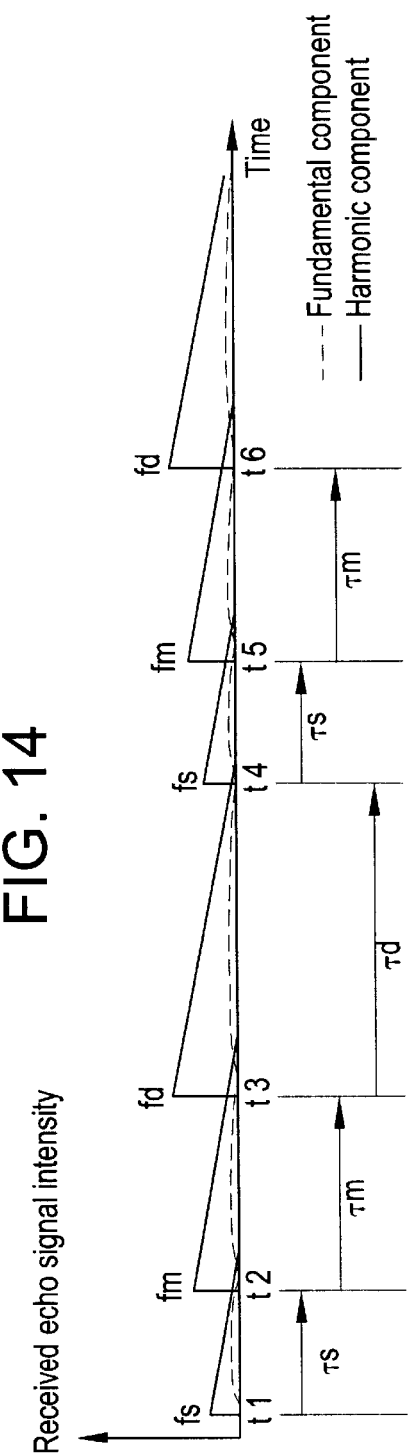
FIG. 13
FIG. 14

ULTRASONIC DIAGNOSTIC APPARATUS

CROSS REFERENCE TO RELATED APPLICATIONS

This application claims the benefit of Japanese Application No. 2001-287989 filed Sep. 21, 2001.

BACKGROUND OF THE INVENTION

The present invention relates to an ultrasonic imaging method and ultrasonic diagnostic apparatus, and more particularly to an ultrasonic imaging method and ultrasonic diagnostic apparatus that eliminate a problem that a good harmonic image cannot be obtained due to a fundamental component of received data for a previous ultrasonic pulse intruding into a fundamental component of received data for a current ultrasonic pulse at a considerable intensity.

FIG. 14 is an explanatory diagram showing timing of B-mode imaging in a conventional ultrasonic diagnostic apparatus. In FIG. 14, a fundamental component is indicated by a solid line and a harmonic component by a broken line because the fundamental component is principal and the harmonic component is subsidiary in the B mode.

When an ultrasonic pulse fs with a relatively shallow (e.g., 5 cm) focus is transmitted at a time t1, the fundamental component of received data (i.e., a component of received data having the same frequency as the transmission frequency) indicated by the solid line in FIG. 14 has an intensity decreasing over time with a maximum at the time t1. The harmonic component (i.e., a component of received data having a frequency twice as high as the transmission frequency) of the received data indicated by the broken line has an intensity rapidly decreasing over time with a maximum slightly after the time t1.

A time t2 is a time point when the intensity of the fundamental component of the received data for the ultrasonic pulse fs transmitted at the time t1 decreases to a negligible level (e.g., the component becomes smaller than a noise component or a detection sensitivity).

When an ultrasonic pulse fm with a relatively intermediate (e.g., 10 cm) focus is transmitted at the time t2, the fundamental component of received data indicated by the solid line in FIG. 14 has an intensity decreasing over time with a maximum at the time t2. The harmonic component of the received data indicated by the broken line has an intensity rapidly decreasing over time with a maximum slightly after the time t2.

A time t3 is a time point when the intensity of the fundamental component of the received data for the ultrasonic pulse fm transmitted at the time t2 decreases to a negligible level.

When an ultrasonic pulse fd with a relatively deep (e.g., 15 cm) focus is transmitted at the time t3, the fundamental component of received data indicated by the solid line in FIG. 14 has an intensity decreasing over time with a maximum at the time t3. The harmonic component of the received data indicated by the broken line has an intensity rapidly decreasing over time with a maximum slightly after the time t3.

A time t4 is a time point when the intensity of the fundamental component of the received data for the ultrasonic pulse fd transmitted at the time t3 decreases to a negligible level.

When an ultrasonic pulse fs with a relatively shallow (e.g., 5 cm) focus is transmitted at the time t4, the fundamental component of received data indicated by the solid line in FIG. 14 has an intensity decreasing over time with a maximum at the time t4. The harmonic component of the received data indicated by the broken line has an intensity rapidly decreasing over time with a maximum slightly after the time t4.

A similar operation is repeated thereafter.

The frame rate is $1/(\tau s+\tau m+\tau d) \div N$, where the interval between the times t1 and t2 is represented by $\tau s$, the interval between the times t2 and t3 is represented by $\tau m$, the interval between the times t3 and t4 is represented by $\tau d$, the ultrasonic pulses fs, fm and fd gives one acoustic line, and the number of acoustic lines in one frame is N. Moreover, $\tau s < \tau m < \tau d$.

If the transmission intervals for the ultrasonic pulses fs, fm and fd are uniformly set to $\tau s$, the received data for the ultrasonic pulse fm remains at a considerable intensity when reception of received data for the ultrasonic pulse fd is started, compromising imaging. Moreover, the received data for the ultrasonic pulse fd remains at a considerable intensity when reception of received data for the ultrasonic pulse fs is started, compromising imaging.

If the intervals are uniformly set to $\tau m$, the received data for the ultrasonic pulse fd remains at a considerable intensity when reception of received data for the ultrasonic pulse fs is started, compromising imaging.

On the other hand, the intervals uniformly set to $\tau d$ do no harm in imaging.

However, the frame rate is $1/(3 \cdot \tau d) \div N$, which is lower than that in FIG. 14.

In other words, the ultrasonic pulses fs, fm and fd are transmitted at timing as shown in FIG. 14 so that a higher frame rate can be achieved.

FIG. 15 is an explanatory diagram showing timing of harmonic-mode imaging according to a filtering technique in the conventional ultrasonic diagnostic apparatus.

In FIG. 15, a harmonic component is indicated by a solid line and a fundamental component by a broken line because the harmonic component is principal and the fundamental component is subsidiary in the harmonic mode. Moreover, the gain is increased to acquire large harmonic components that are inherently small, and accordingly, the fundamental components become larger.

The timing for transmitting the ultrasonic pulses in FIG. 15 is exactly the same as that in the B mode shown in FIG. 14.

FIG. 16 is an explanatory diagram showing timing of harmonic-mode imaging according to a phase inversion technique in the conventional ultrasonic diagnostic apparatus.

When a first ultrasonic pulse fs+ with a relatively shallow focus is transmitted at a time t1, the fundamental component of received data indicated by the broken line in FIG. 16 has an intensity decreasing over time with a maximum at the time t1. The harmonic component of the received data indicated by the solid line has an intensity rapidly decreasing over time with a maximum slightly after the time t1.

When a second ultrasonic pulse fs− with a relatively shallow focus and of a phase opposite to that of the first ultrasonic pulse fs+ is transmitted at a time t2 after a time period $\tau s$ from the time t1 as in the B mode, the fundamental component of received data indicated by the broken line in FIG. 16 has an intensity decreasing over time with a maximum at the time t2. The harmonic component of the received data indicated by the solid line has an intensity rapidly decreasing over time with a maximum slightly after the time t2.

Adding the first and second received data, the fundamental components are canceled out because their phases are opposite, and the harmonic components are doubled because they are in phase. That is, solely the harmonic components can be obtained.

When a first ultrasonic pulse fm+ with a relatively intermediate focus is transmitted at a time t3' after a time period τs from the time t2 as in the B mode, the fundamental component of received data indicated by the broken line in FIG. 16 has an intensity decreasing over time with a maximum at the time t3'. The harmonic component of the received data indicated by the solid line has an intensity rapidly decreasing over time with a maximum slightly after the time t3'.

When a second ultrasonic pulse fm− with a relatively intermediate focus and of a phase opposite to that of the first ultrasonic pulse fm+ is transmitted at a time t4' after a time period τm from the time t3' as in the B mode, the fundamental component of received data indicated by the broken line in FIG. 16 has an intensity decreasing over time with a maximum at the time t4'. The harmonic component of the received data indicated by the solid line has an intensity rapidly decreasing over time with a maximum slightly after the time t4'.

Adding the first and second received data, the fundamental components are canceled out because their phases are opposite, and the harmonic components are doubled because they are in phase. That is, solely the harmonic components can be obtained.

When a first ultrasonic pulse fd+ with a relatively deep focus is transmitted at a time t5' after a time period τm from the time t4' as in the B mode, the fundamental component of received data indicated by the broken line in FIG. 16 has an intensity decreasing over time with a maximum at the time t5'. The harmonic component of the received data indicated by the solid line has an intensity rapidly decreasing over time with a maximum slightly after the time t5'.

When a second ultrasonic pulse fd− with a relatively deep focus and of a phase opposite to that of the first ultrasonic pulse fd+ is transmitted at a time t6' after a time period τd from the time t5' as in the B mode, the fundamental component of received data indicated by the broken line in FIG. 16 has an intensity decreasing over time with a maximum at the time t6'. The harmonic component of the received data indicated by the solid line has an intensity rapidly decreasing over time with a maximum slightly after the time t6'.

Adding the first and second received data, the fundamental components are canceled out because their phases are opposite, and the harmonic components are doubled because they are in phase. That is, solely the harmonic components can be obtained.

Then, a first ultrasonic pulse fs+ with a relatively shallow focus is transmitted at a time t7' after a time period τd from the time t6' as in the B mode.

A similar operation is repeated thereafter.

In the harmonic mode in the conventional ultrasonic diagnostic apparatus, transmission timing for the ultrasonic pulses is the same as that in the B mode.

However, the transmission timing for the ultrasonic pulses in the B mode is such that a next ultrasonic pulse is transmitted when the fundamental component of received data for a previous ultrasonic pulse decreases to a negligible level using a small gain. If the same timing is employed in the harmonic mode in which the gain is increased, the next ultrasonic pulse is transmitted when the fundamental component of received data for the previous ultrasonic pulse has not decreased to a negligible level.

Thus, the filtering technique has a problem that a good harmonic image cannot be obtained because the subsidiary fundamental component has a fundamental component of received data for a previous ultrasonic pulse intruding at a considerable intensity.

In the phase inversion technique, although the fundamental components are to be canceled out by addition, the fundamental component of received data for the ultrasonic pulse fs− intrudes, for example, when the ultrasonic pulse fm+ is transmitted; and the fundamental component of received data for the ultrasonic pulse fm+ intrudes when the ultrasonic pulse fm− is transmitted, as shown in FIG. 16. Thus, the intruding fundamental components cannot be canceled out because they are different, thereby also posing a problem that a good harmonic image cannot be obtained.

SUMMARY OF THE INVENTION

It is therefore an object of the present invention to provide an ultrasonic imaging method and ultrasonic diagnostic apparatus that eliminate a problem that a good harmonic image cannot be obtained due to a fundamental component of received data for a previous ultrasonic pulse intruding into a fundamental component of received data for a current ultrasonic pulse with a considerable intensity.

The present invention, in accordance with its first aspect, provides an ultrasonic imaging method for transmitting an ultrasonic pulse into a subject and receiving an ultrasonic echo from the subject corresponding to said ultrasonic pulse to generate received data, and acquiring harmonic-mode data employing a harmonic component from said received data, characterized in comprising: after transmitting an ultrasonic pulse to a focus on a certain acoustic line, transmitting a next ultrasonic pulse at a time interval such that no effect is received from an ultrasonic echo associated with said former ultrasonic pulse.

In the ultrasonic imaging method of the first aspect, since a next ultrasonic pulse is transmitted at a sufficient time interval after transmitting an ultrasonic pulse to a focus on a certain acoustic line, a fundamental component of received data for a previous ultrasonic pulse is prevented from intruding into a fundamental component of received data for a current ultrasonic pulse at a considerable intensity. Therefore, a good harmonic image can be obtained.

The present invention, in accordance with its second aspect, provides an ultrasonic imaging method for transmitting an ultrasonic pulse into a subject and receiving an ultrasonic echo from the subject corresponding to said ultrasonic pulse to generate received data, and acquiring harmonic-mode data employing a harmonic component from said received data, characterized in comprising: after transmitting an ultrasonic pulse to a focus on a certain acoustic line, transmitting a next ultrasonic pulse to a focus on an acoustic line spaced apart to a degree such that an ultrasonic pulse associated with said former ultrasonic pulse is negligible.

In the ultrasonic imaging method of the second aspect, since a next ultrasonic pulse is transmitted to a next focus sufficiently spaced apart after transmitting an ultrasonic pulse to a focus on a certain acoustic line, a fundamental component of received data for a previous ultrasonic pulse is prevented from intruding into a fundamental component of received data for a current ultrasonic pulse at a considerable intensity. Therefore, a good harmonic image can be obtained.

The present invention, in accordance with its third aspect, provides an ultrasonic imaging method for transmitting a first ultrasonic pulse into a subject and receiving a first ultrasonic echo from the subject corresponding to said first ultrasonic pulse to generate first received data; next transmitting a second ultrasonic pulse of a phase opposite to that of said first ultrasonic pulse into the subject and receiving a second ultrasonic echo from the subject corresponding to said second ultrasonic pulse to generate second received data; and acquiring harmonic-mode data based on a sum of said first and second received data, characterized in comprising: after transmitting said first ultrasonic pulse, transmitting said second ultrasonic pulse at a time interval such that said second ultrasonic echo is not affected by said first ultrasonic pulse.

In the ultrasonic imaging method of the third aspect, since the second ultrasonic pulse is transmitted at a sufficient time interval after transmitting the first ultrasonic pulse, a fundamental component of received data for the first ultrasonic pulse is prevented from intruding into a fundamental component of received data for the second ultrasonic pulse at a considerable intensity. Therefore, a good harmonic image can be obtained.

The present invention, in accordance with its fourth aspect, provides an ultrasonic imaging method for transmitting a first ultrasonic pulse into a subject and receiving a first ultrasonic echo from the subject corresponding to said first ultrasonic pulse to generate first received data; next transmitting a second ultrasonic pulse of a phase opposite to that of said first ultrasonic pulse into the subject and receiving a second ultrasonic echo from the subject corresponding to said second ultrasonic pulse to generate second received data; and acquiring harmonic-mode data based on a sum of said first and second received data, characterized in comprising: sequentially transmitting said first ultrasonic pulse to a plurality of foci on the same acoustic line, and then sequentially transmitting said second ultrasonic pulse to the plurality of foci on the same acoustic line.

In the ultrasonic imaging method of the fourth aspect, since the fundamental component of received data for an ultrasonic pulse transmitted before the first ultrasonic pulse, which component is to intrude into a fundamental component of received data for the first ultrasonic pulse, and the fundamental component of received data for an ultrasonic pulse transmitted before the second ultrasonic pulse, which component is to intrude into a fundamental component of received data for the second ultrasonic pulse, become identical, the intruding fundamental components are canceled out by addition. Therefore, a good harmonic image can be obtained.

The present invention, in accordance with its fifth aspect, provides an ultrasonic imaging method for transmitting a first ultrasonic pulse into a subject and receiving a first ultrasonic echo from the subject corresponding to said first ultrasonic pulse to generate first received data; next transmitting a second ultrasonic pulse of a phase opposite to that of said first ultrasonic pulse into the subject and receiving a second ultrasonic echo from the subject corresponding to said second ultrasonic pulse to generate second received data; and acquiring harmonic-mode data based on a sum of said first and second received data, characterized in comprising: between the transmission of said first ultrasonic pulse and the transmission of said second ultrasonic pulse to a certain focus, conducting transmission of said first or second ultrasonic pulse to one or more foci on one or more other acoustic lines.

In the ultrasonic imaging method of the fifth aspect, since, after transmitting the first ultrasonic pulse, the next ultrasonic pulse is transmitted to a next focus sufficiently spaced apart, and then the second ultrasonic pulse is transmitted, a fundamental component of received data for a previous ultrasonic pulse is prevented from intruding into fundamental components of received data for the first and second ultrasonic pulses at a considerable intensity. Therefore, the intruding fundamental component is prevented from obstructing obtainment of a good harmonic image.

The present invention, in accordance with its sixth aspect, provides the ultrasonic imaging method having the aforesaid configuration, characterized in that the time between transmission of an ultrasonic pulse and transmission of a next ultrasonic pulse is shortened as a corresponding focus is shallower.

In the ultrasonic imaging method of the sixth aspect, since the transmission interval for the ultrasonic pulses is shortened when the focus is shallower and an ultrasonic echo decays more rapidly, and the transmission interval for the ultrasonic pulses is lengthened when the focus is deeper and an ultrasonic echo decays more slowly, the frame rate can be increased without any harm in imaging.

The present invention, in accordance with its seventh aspect, provides the ultrasonic imaging method having the aforesaid configuration, characterized in that the transmission interval for the ultrasonic pulses in a B mode is shorter than the transmission interval for the ultrasonic pulses in a harmonic mode for the same focus.

In the ultrasonic imaging method of the seventh aspect, since the transmission interval for the ultrasonic pulses is longer in the harmonic mode in which the gain is larger, and the transmission interval for the ultrasonic pulses is shorter in the B mode in which the gain is smaller, the frame rate can be increased in the B mode without any harm in imaging.

The present invention, in accordance with its eighth aspect, provides the ultrasonic imaging method having the aforesaid configuration, characterized in that the transmission interval for the ultrasonic pulses in a harmonic mode is equal to the transmission interval for the ultrasonic pulses in a B mode for the same focus.

In the ultrasonic imaging method of the eighth aspect, since the transmission intervals for the ultrasonic pulses in the harmonic mode and in the B-mode are equal, the frame rate can be consistent.

The present invention, in accordance with its ninth aspect, provides an ultrasonic diagnostic apparatus comprising an ultrasonic probe; transmitting/receiving means for driving said ultrasonic probe to transmit an ultrasonic pulse into a subject and receive an ultrasonic echo from the subject to output received data; harmonic-mode data generating means for acquiring harmonic-mode data employing a harmonic component from said received data; image producing means for producing a harmonic-mode image based on said harmonic-mode data; and display means for displaying said harmonic-mode image, characterized in that said transmitting/receiving means transmits, after transmitting an ultrasonic pulse to a focus on a certain acoustic line, a next ultrasonic pulse at a time interval such that no effect is received from an ultrasonic echo associated with said former ultrasonic pulse.

In the ultrasonic diagnostic apparatus of the ninth aspect, the ultrasonic imaging method as described regarding the first aspect can be suitably implemented.

The present invention, in accordance with its tenth aspect, provides an ultrasonic diagnostic apparatus comprising an ultrasonic probe; transmitting/receiving means for driving said ultrasonic probe to transmit an ultrasonic pulse into a subject and receive an ultrasonic echo from the subject to output received data; harmonic-mode data generating means for acquiring harmonic-mode data employing a harmonic component from said received data; image producing means for producing a harmonic-mode image based on said harmonic-mode data; and display means for displaying said harmonic-mode image, characterized in that said transmitting/receiving means transmits, after transmitting an ultrasonic pulse to a focus on a certain acoustic line, a next ultrasonic pulse to a focus on an acoustic line spaced apart to a degree such that an ultrasonic pulse associated with said former ultrasonic pulse is negligible.

In the ultrasonic diagnostic apparatus of the tenth aspect, the ultrasonic imaging method as described regarding the second aspect can be suitably implemented.

The present invention, in accordance with its eleventh aspect, provides an ultrasonic diagnostic apparatus comprising an ultrasonic probe; transmitting/receiving means for driving said ultrasonic probe to transmit an ultrasonic pulse into a subject and receive an ultrasonic echo from the subject to output received data; harmonic-mode data generating means for acquiring harmonic-mode data based on a sum of first received data corresponding to a first ultrasonic pulse and second received data corresponding to a second ultrasonic pulse of a phase opposite to said first ultrasonic pulse; image producing means for producing a harmonic-mode image based on said harmonic-mode data; and display means for displaying said harmonic-mode image, characterized in that said transmitting/receiving means transmits, after transmitting said first ultrasonic pulse, said second ultrasonic pulse at a time interval such that said second ultrasonic echo is not affected by said first ultrasonic pulse.

In the ultrasonic diagnostic apparatus of the eleventh aspect, the ultrasonic imaging method as described regarding the third aspect can be suitably implemented.

The present invention, in accordance with its twelfth aspect, provides the ultrasonic diagnostic apparatus having the aforesaid configuration, characterized in that said transmitting/receiving means sequentially transmits said first ultrasonic pulse to a plurality of foci on the same acoustic line, and then sequentially transmits said second ultrasonic pulse to the plurality of foci on the same acoustic line.

In the ultrasonic diagnostic apparatus of the twelfth aspect, the ultrasonic imaging method as described regarding the fourth aspect can be suitably implemented.

The present invention, in accordance with its thirteenth aspect, provides the ultrasonic diagnostic apparatus having the aforesaid configuration, characterized in that said transmitting/receiving means conducts, between the transmission of said first ultrasonic pulse and the transmission of said second ultrasonic pulse to a certain focus, transmission of said first or second ultrasonic pulse to one or more foci on one or more other acoustic lines.

In the ultrasonic diagnostic apparatus of the thirteenth aspect, the ultrasonic imaging method as described regarding the fifth aspect can be suitably implemented.

The present invention, in accordance with its fourteenth aspect, provides the ultrasonic diagnostic apparatus having the aforesaid configuration, characterized in that said transmitting/receiving means shortens the time between transmission of an ultrasonic pulse and transmission of a next ultrasonic pulse as a corresponding focus is shallower.

In the ultrasonic diagnostic apparatus of the fourteenth aspect, the ultrasonic imaging method as described regarding the sixth aspect can be suitably implemented.

The present invention, in accordance with its fifteenth aspect, provides the ultrasonic diagnostic apparatus having the aforesaid configuration, characterized in that said transmitting/receiving means makes the transmission interval of ultrasonic pulses in a B mode shorter than the transmission interval of ultrasonic pulses in a harmonic mode for the same focus.

In the ultrasonic diagnostic apparatus of the fifteenth aspect, the ultrasonic imaging method as described regarding the seventh aspect can be suitably implemented.

The present invention, in accordance with its sixteenth aspect, provides the ultrasonic diagnostic apparatus having the aforesaid configuration, characterized in that said transmitting/receiving means makes the transmission interval of ultrasonic pulses in a harmonic mode equal to the transmission interval of ultrasonic pulses in a B mode for the same focus.

In the ultrasonic diagnostic apparatus of the sixteenth aspect, the ultrasonic imaging method as described regarding the eighth aspect can be suitably implemented.

According to the ultrasonic imaging method and ultrasonic diagnostic apparatus of the present invention, the intrusion of a fundamental component of received data for a previous ultrasonic pulse into a fundamental component of received data for a current ultrasonic pulse at a considerable intensity is prevented from obstructing obtainment of a good harmonic image, and hence, a good harmonic image can be obtained.

Further objects and advantages of the present invention will be apparent from the following description of the preferred embodiments of the invention as illustrated in the accompanying drawings.

BRIEF DESCRIPTION OF THE DRAWINGS

FIG. 13 is a timing chart showing the operation in a harmonic mode in the ultrasonic diagnostic apparatus in accordance with the fifth embodiment.

FIG. 14 is a timing chart showing the operation in a B mode in a conventional ultrasonic diagnostic apparatus.

DETAILED DESCRIPTION OF THE INVENTION

The present invention will now be described in more detail with reference to several embodiments shown in the accompanying drawings.

First Embodiment

Figure 1:
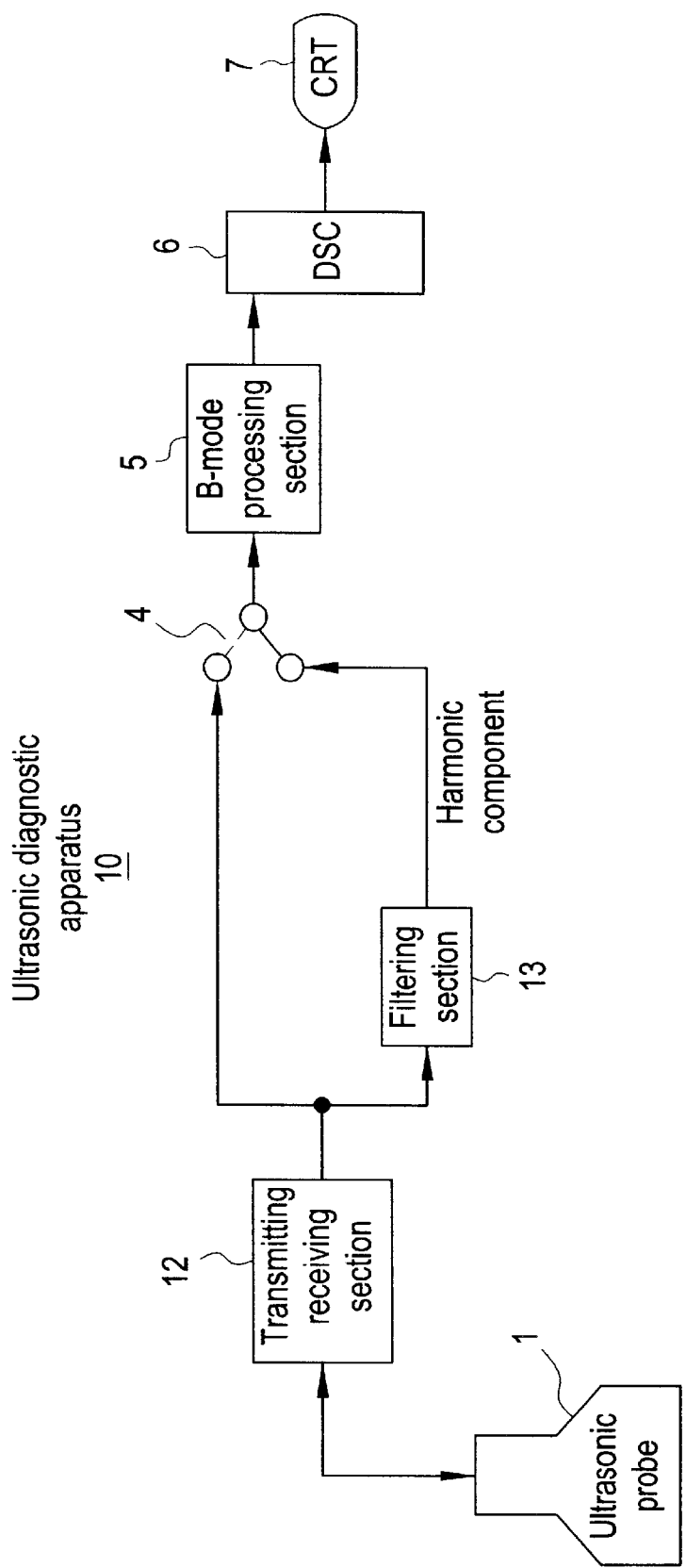
FIG. 1 is a configuration diagram showing an ultrasonic diagnostic apparatus in accordance with a first embodiment.

FIG. 1 is a configuration diagram showing an ultrasonic diagnostic apparatus in accordance with a first embodiment.

The ultrasonic diagnostic apparatus 10 comprises an ultrasonic probe 1, a transmitting/receiving section 12 for driving the ultrasonic probe 1 to transmit an ultrasonic pulse into a subject and receive an ultrasonic echo from the subject to output received data, a filtering section 13 for acquiring harmonic-mode data employing a harmonic component from the received data, a mode switching section 4 for switching between a B mode and a harmonic mode, a B-mode processing section 5 for generating image data from the received data or harmonic-mode data, a DSC 6 for generating image display data, and a CRT 7 for displaying an image.

Figure 2:
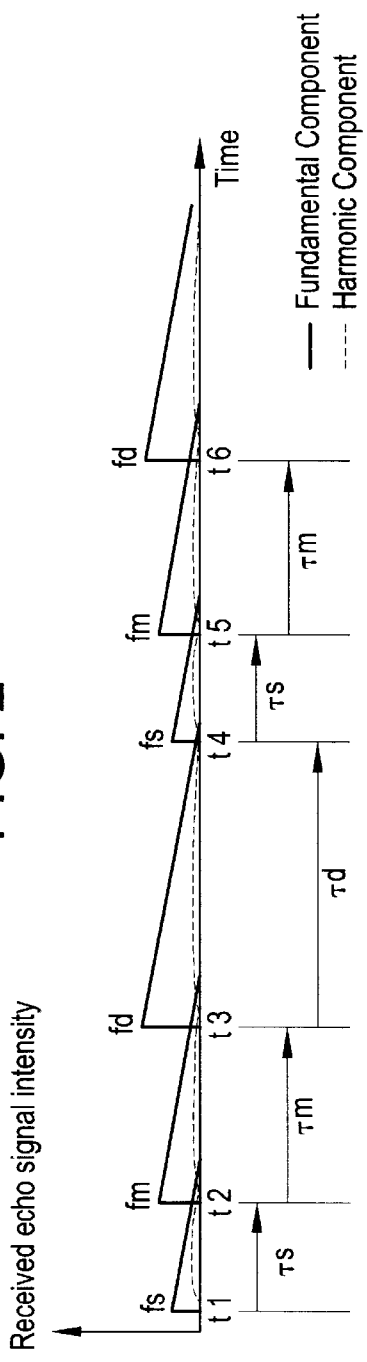
FIG. 2 is a timing chart showing the operation in a B mode in the ultrasonic diagnostic apparatus in accordance with the first embodiment.

FIG. 2 is an explanatory diagram showing imaging timing when a B mode is selected at the mode switching section 4.

In FIG. 2, a fundamental component is indicated by a solid line and a harmonic component by a broken line because the fundamental component is principal and the harmonic component is subsidiary in the B mode.

When an ultrasonic pulse fs with a relatively shallow (e.g., 5 cm) focus is transmitted at a time t1, the fundamental component of received data (i.e., a component of received data having the same frequency as the transmission frequency) indicated by the solid line in FIG. 2 has an intensity decreasing over time with a maximum at the time t1. The harmonic component (i.e., a component of received data having a frequency twice as high as the transmission frequency) of the received data indicated by the broken line has an intensity rapidly decreasing over time with a maximum slightly after the time t1.

A time t2 is a time point when the intensity of the fundamental component of the received data for the ultrasonic pulse fs transmitted at the time t1 decreases to a negligible level (e.g., the component becomes smaller than a noise component or a detection sensitivity).

When an ultrasonic pulse fm with a relatively intermediate (e.g., 10 cm) focus is transmitted at the time t2, the fundamental component of received data indicated by the solid line in FIG. 2 has an intensity decreasing over time with a maximum at the time t2. The harmonic component of the received data indicated by the broken line has an intensity rapidly decreasing over time with a maximum slightly after the time t2.

A time t3 is a time point when the intensity of the fundamental component of the received data for the ultrasonic pulse fm transmitted at the time t2 decreases to a negligible level.

When an ultrasonic pulse fd with a relatively deep (e.g., 15 cm) focus is transmitted at the time t3, the fundamental component of received data indicated by the solid line in FIG. 2 has an intensity decreasing over time with a maximum at the time t3. The harmonic component of the received data indicated by the broken line has an intensity rapidly decreasing over time with a maximum slightly after the time t3.

A time t4 is a time point when the intensity of the fundamental component of the received data for the ultrasonic pulse fd transmitted at the time t3 decreases to a negligible level.

When an ultrasonic pulse fs with a relatively shallow (e.g., 5 cm) focus is transmitted at the time t4, the fundamental component of received data indicated by the solid line in FIG. 2 has an intensity decreasing over time with a maximum at the time t4. The harmonic component of the received data indicated by the broken line has an intensity rapidly decreasing over time with a maximum slightly after the time t4.

A similar operation is repeated thereafter.

The frame rate is $1/(\tau s+\tau m+\tau d) \div N$, where the interval between the times t1 and t2 is represented by $\tau s$, the interval between the times t2 and t3 is represented by $\tau m$, the interval between the times t3 and t4 is represented by $\tau d$, the ultrasonic pulses fs, fm and fd gives one acoustic line, and the number of acoustic lines in one frame is N. Moreover, $\tau s < \tau m < \tau d$.

If the transmission intervals for the ultrasonic pulses fs, fm and fd are uniformly set to $\tau s$, the received data for the ultrasonic pulse fm remains at a considerable intensity when reception of received data for the ultrasonic pulse fd is started, compromising imaging. Moreover, the received data for the ultrasonic pulse fd remains at a considerable intensity when reception of received data for the ultrasonic pulse fs is started, compromising imaging.

If the intervals are uniformly set to $\tau m$, the received data for the ultrasonic pulse fd remains at a considerable intensity when reception of received data for the ultrasonic pulse fs is started, compromising imaging.

On the other hand, the intervals uniformly set to $\tau d$ do no harm in imaging.

However, the frame rate is $1/(3 \cdot \tau d) \div N$, which is lower than that in FIG. 2.

In other words, the ultrasonic pulses fs, fm and fd are transmitted at timing as shown in FIG. 2 so that a higher frame rate can be achieved.

Figure 3:
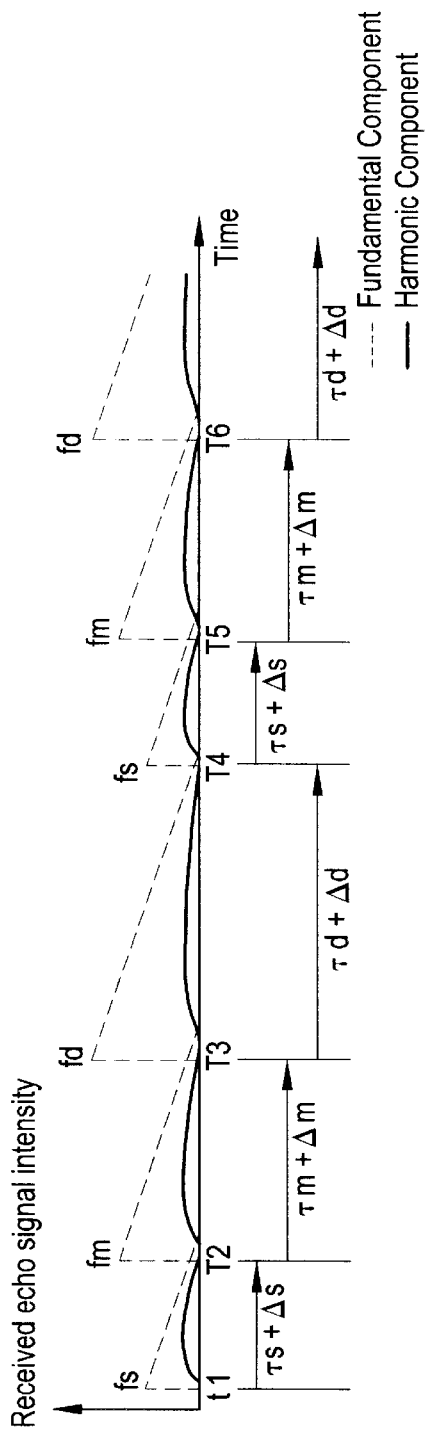
FIG. 3 is a timing chart showing the operation in a harmonic mode in the ultrasonic diagnostic apparatus in accordance with the first embodiment.

FIG. 3 is an explanatory diagram showing imaging timing when a harmonic mode is selected at the mode switching section 4.

In FIG. 3, a harmonic component is indicated by a solid line and a fundamental component by a broken line because the harmonic component is principal and the fundamental component is subsidiary in the harmonic mode. Moreover, the gain is increased to acquire large harmonic components that are inherently small, and accordingly, the fundamental components become larger.

When an ultrasonic pulse fs with a relatively shallow focus is transmitted at a time t1, the fundamental component of received data indicated by the broken line in FIG. 3 has an intensity decreasing over time with a maximum at the time t1. The harmonic component of the received data indicated by the solid line has an intensity rapidly decreasing over time with a maximum slightly after the time t1.

A time T2 is a time point when the intensity of the fundamental component of the received data for the ultrasonic pulse fs transmitted at the time t1 decreases to a negligible level. Since the fundamental component is larger than that in the B mode as described above, the time period (τs+Δs) from the time t1 to the time T2 is longer than the time period τs in the B mode.

When an ultrasonic pulse fm with a relatively intermediate focus is transmitted at the time T2, the fundamental component of received data indicated by the broken line in FIG. 3 has an intensity decreasing over time with a maximum at the time T2. The harmonic component of the received data indicated by the solid line has an intensity rapidly decreasing over time with a maximum slightly after the time T2.

A time T3 is a time point when the intensity of the fundamental component of the received data for the ultrasonic pulse fm transmitted at the time T2 decreases to a negligible level. Since the fundamental component is larger than that in the B mode as described above, the time period (τm+Δm) from the time T2 to the time T3 is longer than the time period τm in the B mode.

When an ultrasonic pulse fd with a relatively deep focus is transmitted at the time T3, the fundamental component of received data indicated by the broken line in FIG. 3 has an intensity decreasing over time with a maximum at the time T3. The harmonic component of the received data indicated by the solid line has an intensity rapidly decreasing over time with a maximum slightly after the time T3.

A time T4 is a time point when the intensity of the fundamental component of the received data for the ultrasonic pulse fd transmitted at the time T3 decreases to a negligible level. Since the fundamental component is larger than that in the B mode as described above, the time period (τd+Δd) from the time T3 to the time T4 is longer than the time period τd in the B mode.

When an ultrasonic pulse fs with a relatively shallow focus is transmitted at the time T4, the fundamental component of received data indicated by the broken line in FIG. 3 has an intensity decreasing over time with a maximum at the time T4. The harmonic component of the received data indicated by the solid line has an intensity rapidly decreasing over time with a maximum slightly after the time T4.

A similar operation is repeated thereafter.

The frame rate is $1/(\tau s+\Delta s+\tau m+\Delta m+\tau d+\Delta d)\div N$, where the ultrasonic pulses fs, fm and fd gives one acoustic line, and the number of acoustic lines in one frame is N. Moreover, τs+Δs<τm+Δm<τd+Δd.

If the transmission intervals for the ultrasonic pulses fs, fm and fd are uniformly set to τs+Δs, the received data for the ultrasonic pulse fm remains at a considerable intensity when reception of received data for the ultrasonic pulse fd is started, compromising imaging. Moreover, the received data for the ultrasonic pulse fd remains at a considerable intensity when reception of received data for the ultrasonic pulse fs is started, compromising imaging.

If the intervals are uniformly set to τm+Δm, the received data for the ultrasonic pulse fd remains at a considerable intensity when reception of received data for the ultrasonic pulse fs is started, compromising imaging.

On the other hand, the intervals uniformly set to τd+Δd do no harm in imaging.

However, the frame rate is $1/\{3\cdot(\tau d+\Delta d)\}\div N$, which is lower than that in FIG. 3.

In other words, by transmitting the ultrasonic pulses fs, fm and fd at timing as shown in FIG. 3, a high frame rate can be achieved. Moreover, since a current ultrasonic pulse is transmitted after the fundamental component of received data for a previous ultrasonic pulse has decreased to a negligible intensity, harm due to intrusion is prevented, thus providing a good harmonic image.

Second Embodiment

Figure 4:
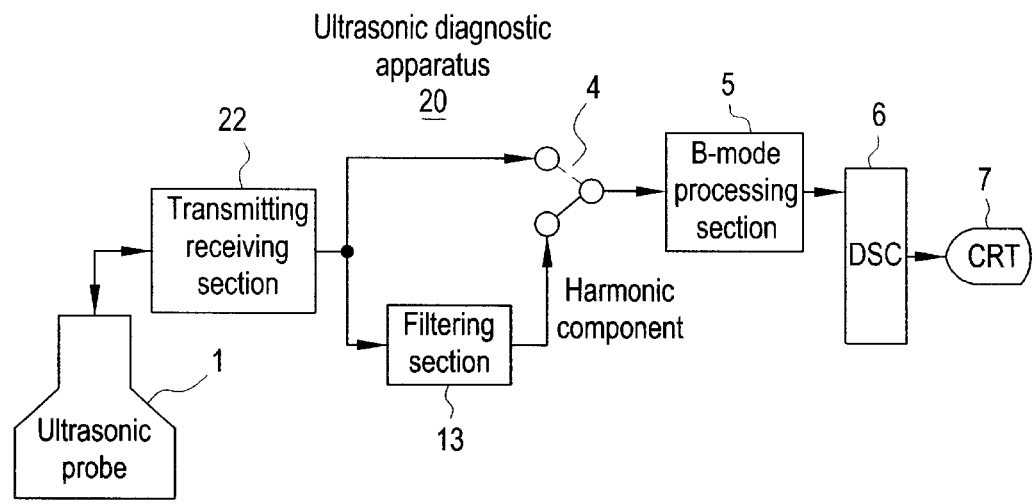
FIG. 4 is a configuration diagram showing an ultrasonic diagnostic apparatus in accordance with a second embodiment.

FIG. 4 is a configuration diagram showing an ultrasonic diagnostic apparatus in accordance with a second embodiment.

The ultrasonic diagnostic apparatus 20 comprises an ultrasonic probe 1, a transmitting/receiving section 22 for driving the ultrasonic probe 1 to transmit an ultrasonic pulse into a subject and receive an ultrasonic echo from the subject to output received data, a filtering section 13 for acquiring harmonic-mode data employing a harmonic component from the received data, a mode switching section 4 for switching between a B mode and a harmonic mode, a B-mode processing section 5 for generating image data from the received data or harmonic-mode data, a DSC 6 for generating image display data, and a CRT 7 for displaying an image.

The imaging timing when the B mode is selected at the mode switching section 4 is the same as that in FIG. 2 (first embodiment).

Figure 5:
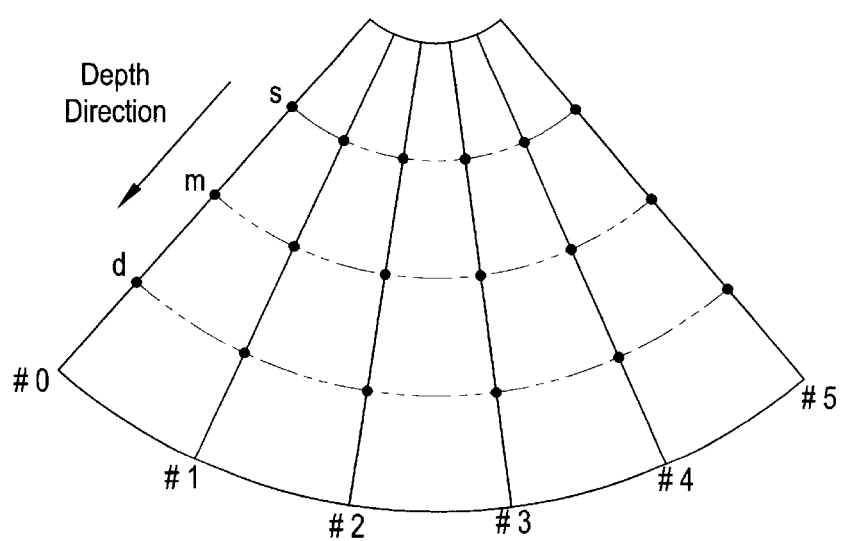
FIG. 5 is a diagram for explaining acoustic lines constituting a frame and foci on the acoustic lines.

FIG. 5 is a conceptual diagram of acoustic lines constituting one frame.

It is assumed that one acoustic line is acquired by an ultrasonic pulse fs with a shallow focus, an ultrasonic pulse fm with an intermediate focus, and an ultrasonic pulse fd with a deep focus, and one frame is formed by acoustic lines #0–#5 in different directions.

Figure 6:
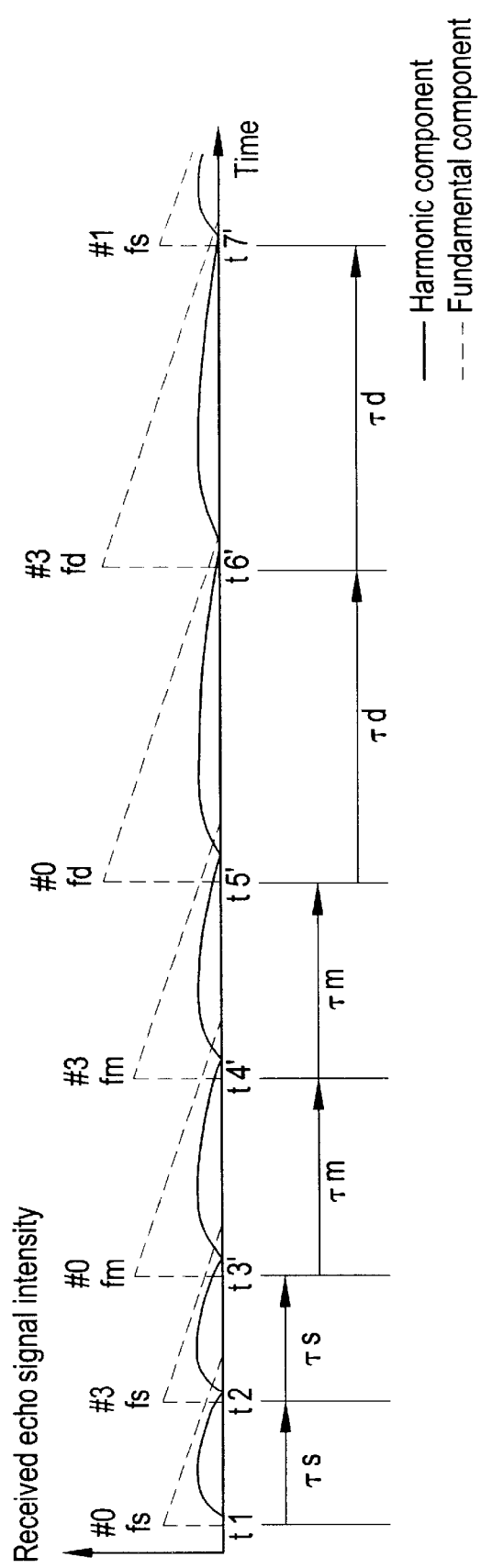
FIG. 6 is a timing chart showing the operation in a harmonic mode in the ultrasonic diagnostic apparatus in accordance with the second embodiment.

FIG. 6 is an explanatory diagram showing imaging timing when a harmonic mode is selected at the mode switching section 4.

When an ultrasonic pulse #0fs with a relatively shallow focus on the acoustic line #0 is transmitted at a time t1, the fundamental component of received data indicated by the broken line in FIG. 6 has an intensity decreasing over time with a maximum at the time t1. The harmonic component of the received data indicated by the solid line has an intensity rapidly decreasing over time with a maximum slightly after the time t1.

A time t2 is after a time period τs from the time t1 as in the B mode.

When an ultrasonic pulse #3fs with a relatively shallow focus on the acoustic line #3 is transmitted at the time t2, the fundamental component of received data indicated by the broken line in FIG. 6 has an intensity decreasing over time with a maximum at the time t2. The harmonic component of the received data indicated by the solid line has an intensity rapidly decreasing over time with a maximum slightly after the time t2.

The time period τs from the time t1 to the time t2 is the same as that in the B mode in spite of the larger fundamental component. However, since the acoustic lines #0 and #3 are in different directions, even if the fundamental component for the ultrasonic pulse #0fs intrudes into the fundamental component for the ultrasonic pulse #3fs, it is at a negligible degree.

A time t3' is after a time period τs from the time t2.

When an ultrasonic pulse #0fm with a relatively intermediate focus on the acoustic line #0 is transmitted at the time t3', the fundamental component of received data indicated by the broken line in FIG. 6 has an intensity decreasing over time with a maximum at the time t3'. The harmonic component of the received data indicated by the solid line has an intensity rapidly decreasing over time with a maximum slightly after the time t3'.

The time period τs from the time t2 to the time t3' is the same as that in the B mode in spite of the larger fundamental component. However, since the acoustic lines #0 and #3 are in different directions, even if the fundamental component for the ultrasonic pulse #3fs intrudes into the fundamental component for the ultrasonic pulse #0fm, it is at a negligible degree.

A time t4' is after a time period τm from the time t3'.

When an ultrasonic pulse #3fm with a relatively intermediate focus on the acoustic line #3 is transmitted at the time t4', the fundamental component of received data indicated by the broken line in FIG. 6 has an intensity decreasing over time with a maximum at the time t4'. The harmonic component of the received data indicated by the solid line has an intensity rapidly decreasing over time with a maximum slightly after the time t4'.

The time period τm from the time t3' to the time t4' is the same as that in the B mode in spite of the larger fundamental component. However, since the acoustic lines #0 and #3 are in different directions, even if the fundamental component for the ultrasonic pulse #0fm intrudes into the fundamental component for the ultrasonic pulse #3fm, it is at a negligible degree.

A time t5' is after a time period τm from the time t4'.

When an ultrasonic pulse #0fd with a relatively deep focus on the acoustic line #0 is transmitted at the time t5', the fundamental component of received data indicated by the broken line in FIG. 6 has an intensity decreasing over time with a maximum at the time t5'. The harmonic component of the received data indicated by the solid line has an intensity rapidly decreasing over time with a maximum slightly after the time t5'.

The time period τm from the time t4' to the time t5' is the same as that in the B mode in spite of the larger fundamental component. However, since the acoustic lines #0 and #3 are in different directions, even if the fundamental component for the ultrasonic pulse #3fm intrudes into the fundamental component for the ultrasonic pulse #0fd, it is at a negligible degree.

A time t6' is after a time period τd from the time t5'.

When an ultrasonic pulse #3fd with a relatively deep focus on the acoustic line #3 is transmitted at the time t6', the fundamental component of received data indicated by the broken line in FIG. 6 has an intensity decreasing over time with a maximum at the time t6'. The harmonic component of the received data indicated by the solid line has an intensity rapidly decreasing over time with a maximum slightly after the time t6'.

The time period τd from the time t5' to the time t6' is the same as that in the B mode in spite of the larger fundamental component. However, since the acoustic lines #0 and #3 are in different directions, even if the fundamental component for the ultrasonic pulse #0fd intrudes into the fundamental component for the ultrasonic pulse #3fd, it is at a negligible degree.

A time t7' is after a time period τd from the time t6'.

When an ultrasonic pulse #1fs with a relatively shallow focus on the acoustic line #1 is transmitted at the time t7', the fundamental component of received data indicated by the broken line in FIG. 6 has an intensity decreasing over time with a maximum at the time t7'. The harmonic component of the received data indicated by the solid line has an intensity rapidly decreasing over time with a maximum slightly after the time t7'.

The time period τd from the time t6' to the time t7' is the same as that in the B mode in spite of the larger fundamental component. However, since the acoustic lines #1 and #3 are in different directions, even if the fundamental component for the ultrasonic pulse #3fd intrudes into the fundamental component for the ultrasonic pulse #1fs, it is at a negligible degree.

A similar operation is repeated thereafter.

The frame rate is $1/(\tau s+\tau m+\tau d) \div N$, i.e., a frame rate as high as that in the B-mode can be achieved. Moreover, since a current ultrasonic pulse is transmitted to a focus on an acoustic line in a different direction such that the fundamental component of received data for a previous ultrasonic pulse can be neglected, harm due to intrusion is prevented, thus providing a good harmonic image.

Third Embodiment

Figure 7:
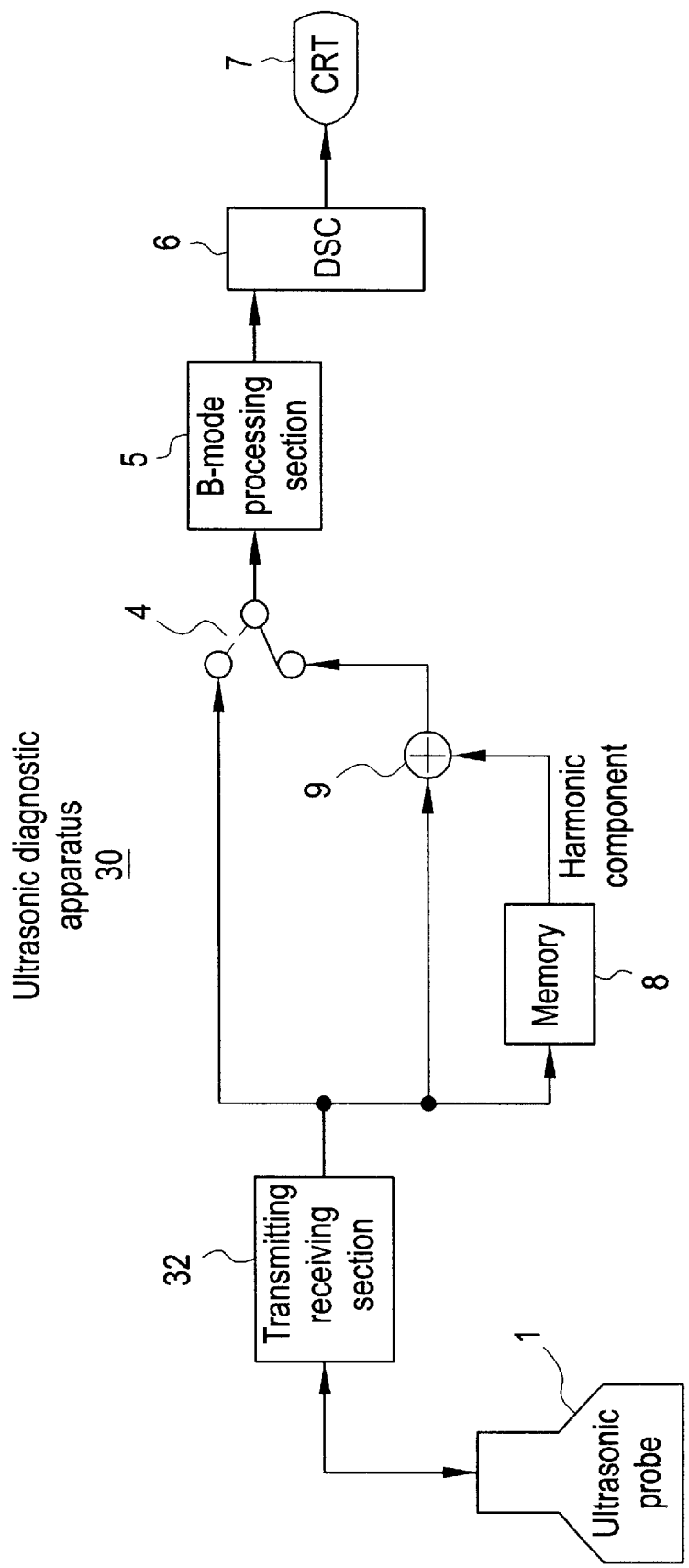
FIG. 7 is a configuration diagram showing an ultrasonic diagnostic apparatus in accordance with a third embodiment.

FIG. 7 is a configuration diagram showing an ultrasonic diagnostic apparatus in accordance with a third embodiment.

The ultrasonic diagnostic apparatus 30 comprises an ultrasonic probe 1, a transmitting/receiving section 32 for driving the ultrasonic probe 1 to transmit an ultrasonic pulse into a subject and receive an ultrasonic echo from the subject to output received data, a memory 8 for storing first received data corresponding to a first ultrasonic pulse, an adder 9 for acquiring harmonic-mode data by adding second received data corresponding to a second ultrasonic pulse of a phase opposite to the first ultrasonic pulse and the first received data stored in the memory 8, a mode switching section 4 for switching between a B mode and a harmonic mode, a B-mode processing section 5 for generating image data from the received data or harmonic-mode data, a DSC 6 for generating image display data, and a CRT 7 for displaying an image.

The imaging timing when the B mode is selected at the mode switching section 4 is the same as that in FIG. 2 (first embodiment).

Figure 8:
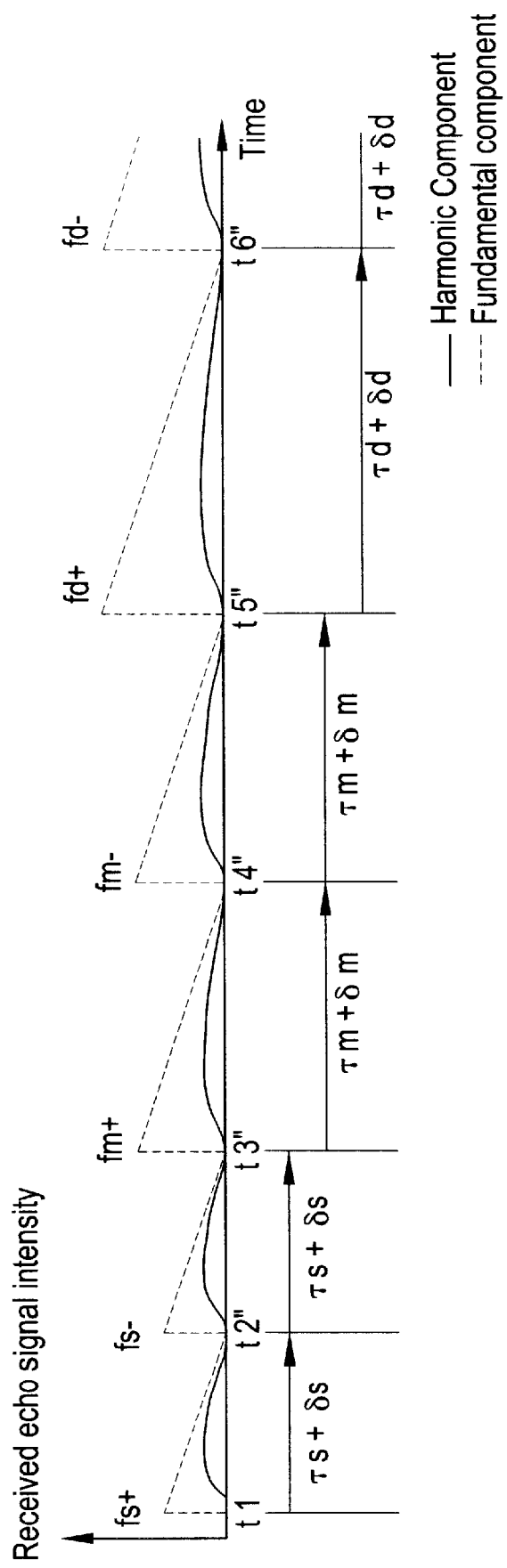
FIG. 8 is a timing chart showing the operation in a harmonic mode in the ultrasonic diagnostic apparatus in accordance with the third embodiment.

FIG. 8 is an explanatory diagram showing imaging timing when a harmonic mode is selected at the mode switching section 4.

When a first ultrasonic pulse fs+ with a relatively shallow focus is transmitted at a time t1, the fundamental component of first received data indicated by the broken line in FIG. 8 has an intensity decreasing over time with a maximum at the time t1. The harmonic component of the first received data indicated by the solid line has an intensity rapidly decreasing over time with a maximum slightly after the time t1.

A time t2" is a time point when the intensity of the fundamental component of the first received data for the first ultrasonic pulse fs+ transmitted at the time t1 decreases to a negligible level. Since the fundamental component is larger than that in the B mode as described above, the time period $(\tau s+\delta s)$ from the time t1 to the time t2" is longer the time period τs in the B mode.

When a second ultrasonic pulse fs– with a relatively shallow focus and of a phase opposite to that of the first ultrasonic pulse fs+ is transmitted at the time t2", the fundamental component of second received data indicated by the broken line in FIG. 8 has an intensity decreasing over time with a maximum at the time t2". The harmonic component of the second received data indicated by the solid line has an intensity rapidly decreasing over time with a maximum slightly after the time t2".

A time t3" is a time point when the intensity of the fundamental component of the second received data for the second ultrasonic pulse fs– transmitted at the time t2" decreases to a negligible level. Since the fundamental component is larger than that in the B mode as described above, the time period $(\tau s+\delta s)$ from the time t2" to the time t3" is longer the time period τs in the B mode.

When a first ultrasonic pulse fm+ with a relatively intermediate focus is transmitted at the time t3", the fundamental component of first received data indicated by the broken line in FIG. 8 has an intensity decreasing over time with a maximum at the time t3". The harmonic component of the first received data indicated by the solid line has an intensity rapidly decreasing over time with a maximum slightly after the time t3".

A time t4" is a time point when the intensity of the fundamental component of the first received data for the first ultrasonic pulse fm+ transmitted at the time t3" decreases to a negligible level. Since the fundamental component is larger than that in the B mode as described above, the time period (τm+δm) from the time t3" to the time t4" is longer the time period τm in the B mode.

When a second ultrasonic pulse fm− with a relatively intermediate focus and of a phase opposite to that of the first ultrasonic pulse fm+ is transmitted at the time t4", the fundamental component of second received data indicated by the broken line in FIG. 8 has an intensity decreasing over time with a maximum at the time t4". The harmonic component of the second received data indicated by the solid line has an intensity rapidly decreasing over time with a maximum slightly after the time t4".

A time t5" is a time point when the intensity of the fundamental component of the second received data for the second ultrasonic pulse fm− transmitted at the time t4" decreases to a negligible level. Since the fundamental component is larger than that in the B mode as described above, the time period (τm+δm) from the time t4" to the time t5" is longer the time period τm in the B mode.

When a first ultrasonic pulse fd+ with a relatively deep focus is transmitted at the time t5", the fundamental component of first received data indicated by the broken line in FIG. 8 has an intensity decreasing over time with a maximum at the time t5". The harmonic component of the first received data indicated by the solid line has an intensity rapidly decreasing over time with a maximum slightly after the time t5".

A time t6" is a time point when the intensity of the fundamental component of the first received data for the first ultrasonic pulse fd+ transmitted at the time t5" decreases to a negligible level. Since the fundamental component is larger than that in the B mode as described above, the time period (τd+δd) from the time t5" to the time t6" is longer the time period τd in the B mode.

When a second ultrasonic pulse fd− with a relatively deep focus and of a phase opposite to that of the first ultrasonic pulse fd+ is transmitted at the time t6", the fundamental component of second received data indicated by the broken line in FIG. 8 has an intensity decreasing over time with a maximum at the time t6". The harmonic component of the second received data indicated by the solid line has an intensity rapidly decreasing over time with a maximum slightly after the time t6".

A similar operation is repeated thereafter.

Adding the first and second received data at the adder 9, the fundamental components are canceled out because their phases are opposite, and the harmonic components are doubled because they are in phase. That is, solely the harmonic components can be obtained.

In the phase inversion technique shown in FIG. 8, since the fundamental component of received data for a previous ultrasonic pulse is decreased to a negligible intensity when transmitting a certain ultrasonic pulse, the previous fundamental component is prevented from intruding, thus providing a good harmonic image.

Fourth Embodiment

Figure 9:
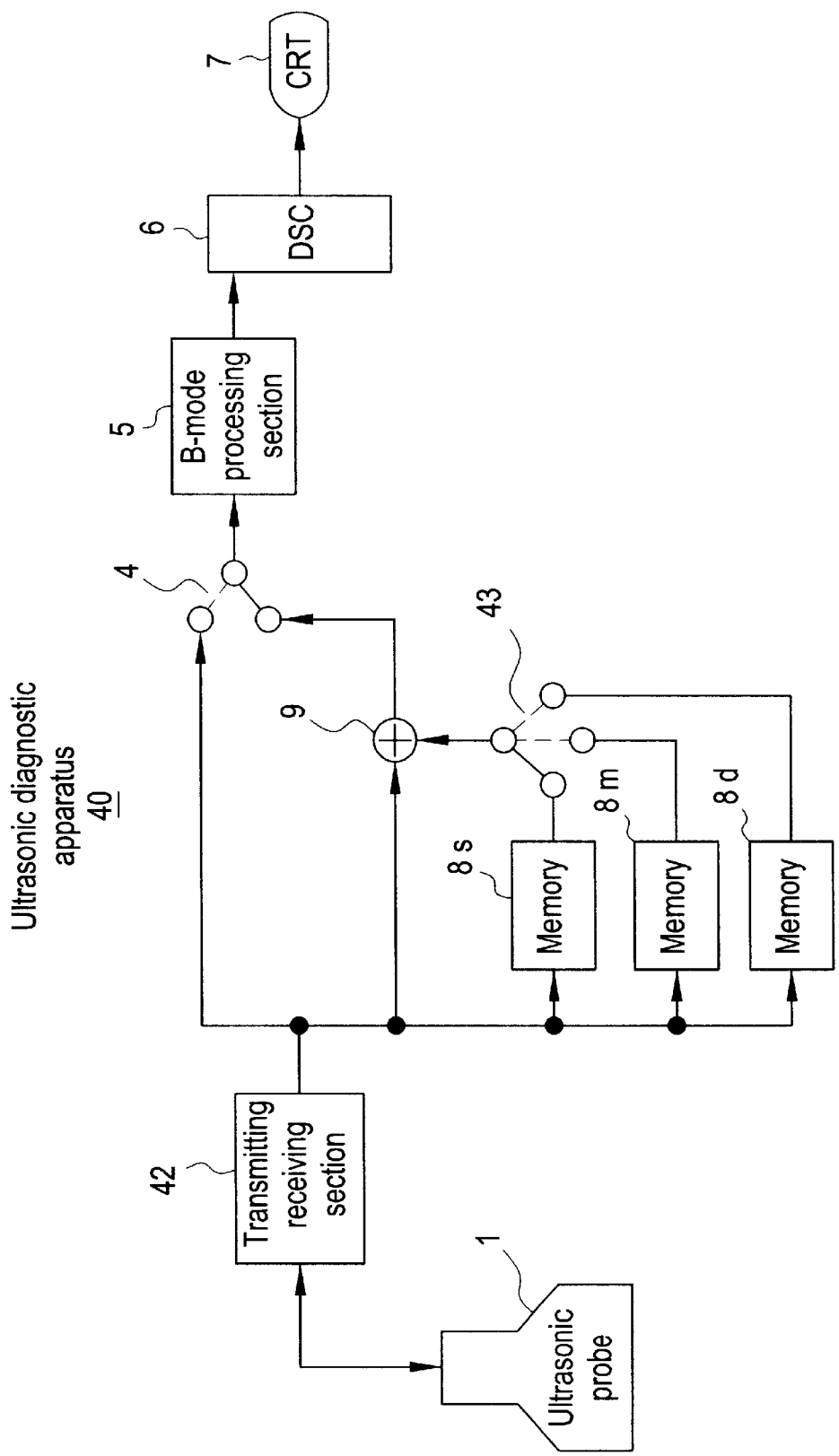
FIG. 9 is a configuration diagram showing an ultrasonic diagnostic apparatus in accordance with a fourth embodiment.

FIG. 9 is a configuration diagram showing an ultrasonic diagnostic apparatus in accordance with a fourth embodiment.

The ultrasonic diagnostic apparatus 40 comprises an ultrasonic probe 1, a transmitting/receiving section 42 for driving the ultrasonic probe 1 to transmit an ultrasonic pulse into a subject and receive an ultrasonic echo from the subject to output received data, a memory 8s for storing first received data corresponding to a first ultrasonic pulse with a relatively shallow focus, a memory 8m for storing first received data corresponding to a first ultrasonic pulse with a relatively intermediate focus, a memory 8d for storing first received data corresponding to a first ultrasonic pulse with a relatively deep focus, a selector 43 for selecting from among the memories 8s, 8m and 8d, an adder 9 for acquiring harmonic-mode data by adding second received data corresponding to a second ultrasonic pulse of a phase opposite to that of the first ultrasonic pulse and the first received data selected by the selector 43, a mode switching section 4 for switching between a B mode and a harmonic mode, a B-mode processing section 5 for generating image data from the received data or harmonic-mode data, a DSC 6 for generating image display data, and a CRT 7 for displaying an image.

The imaging timing when the B mode is selected at the mode switching section 4 is the same as that in FIG. 2 (first embodiment).

Figure 10:
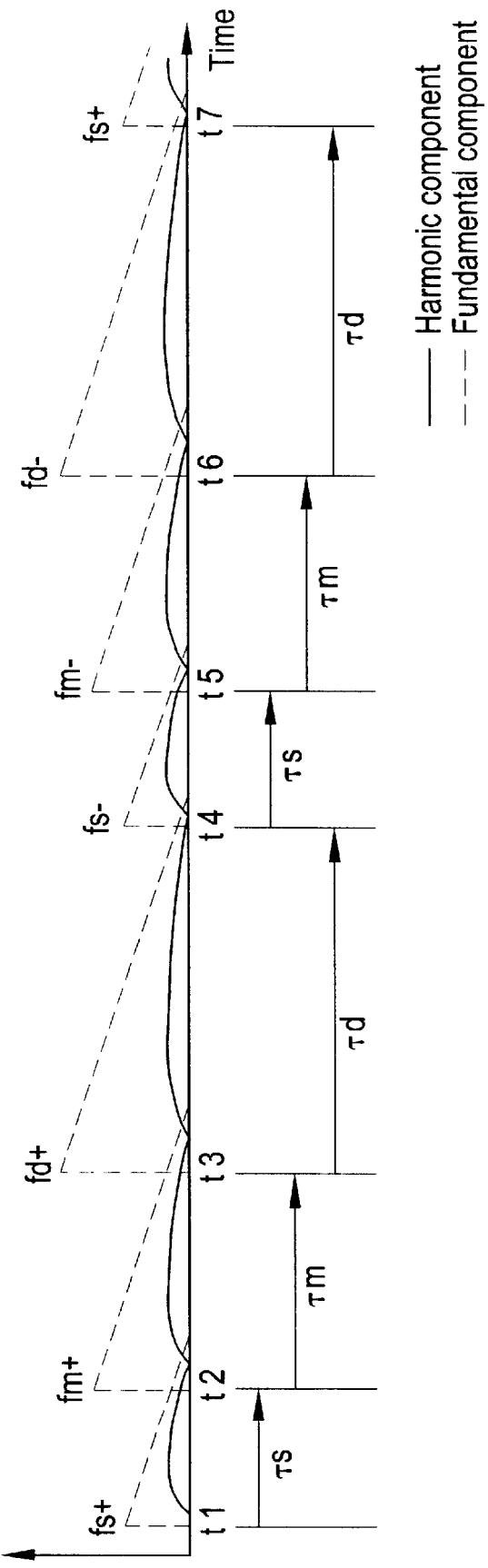
FIG. 10 is a timing chart showing the operation in a harmonic mode in the ultrasonic diagnostic apparatus in accordance with the fourth embodiment.

FIG. 10 is an explanatory diagram showing imaging timing when a harmonic mode is selected at the mode switching section 4.

When a first ultrasonic pulse fs+ with a relatively shallow focus is transmitted at a time t1, the fundamental component of first received data indicated by the broken line in FIG. 10 has an intensity decreasing over time with a maximum at the time t1. The harmonic component of the first received data indicated by the solid line has an intensity rapidly decreasing over time with a maximum slightly after the time t1.

A time t2 is after a time period τs from the time t1 as in the B mode.

When a first ultrasonic pulse fm+ with a relatively intermediate focus is transmitted at the time t2, the fundamental component of first received data indicated by the broken line in FIG. 10 has an intensity decreasing over time with a maximum at the time t2. The harmonic component of the first received data indicated by the solid line has an intensity rapidly decreasing over time with a maximum slightly after the time t2.

A time t3 is after a time period τm from the time t2 as in the B mode.

When a first ultrasonic pulse fd+ with a relatively deep focus is transmitted at the time t3, the fundamental component of first received data indicated by the broken line in FIG. 10 has an intensity decreasing over time with a maximum at the time t3. The harmonic component of the first received data indicated by the solid line has an intensity rapidly decreasing over time with a maximum slightly after the time t3.

A time t4 is after a time period τd from the time t3 as in the B mode.

When a second ultrasonic pulse fs− with a relatively shallow focus and of a phase opposite to that of the first ultrasonic pulse fs+ is transmitted at the time t4, the fundamental component of second received data indicated by the broken line in FIG. 10 has an intensity decreasing over time with a maximum at the time t4. The harmonic component of the second received data indicated by the solid line has an intensity rapidly decreasing over time with a maximum slightly after the time t4.

A time t5 is after a time period τs from the time t4 as in the B mode.

When a second ultrasonic pulse fm− with a relatively intermediate focus and of a phase opposite to that of the first ultrasonic pulse fm+ is transmitted at the time t5, the fundamental component of second received data indicated by the broken line in FIG. 10 has an intensity decreasing over time with a maximum at the time t5. The harmonic component of the second received data indicated by the solid line has an intensity rapidly decreasing over time with a maximum slightly after the time t5.

A time t6 is after a time period τm from the time t5 as in the B mode.

When a second ultrasonic pulse fd− with a relatively deep focus and of a phase opposite to that of the first ultrasonic pulse fd+ is transmitted at the time t6, the fundamental component of second received data indicated by the broken line in FIG. 10 has an intensity decreasing over time with a maximum at the time t6. The harmonic component of the second received data indicated by the solid line has an intensity rapidly decreasing over time with a maximum slightly after the time t6.

A time t7is after a time period τd from the time t6 as in the B mode.

When a first ultrasonic pulse fs+ with a relatively shallow focus on a next acoustic line is transmitted at the time t7, the fundamental component of first received data indicated by the broken line in FIG. 10 has an intensity decreasing over time with a maximum at the time t7. The harmonic component of the first received data indicated by the solid line has an intensity rapidly decreasing over time with a maximum slightly after the time t7.

A similar operation is repeated thereafter.

Adding the first and second received data at the adder 9, the fundamental components are canceled out because their phases are opposite, and the harmonic components are doubled because they are in phase. That is, solely the harmonic components can be obtained.

In the phase inversion technique shown in FIG. 10, the fundamental component of received data for the ultrasonic pulse fs+ intrudes when transmitting the first ultrasonic pulse fm+ at the time t2, for example, and the fundamental component of received data for the ultrasonic pulse fs− intrudes when transmitting the second ultrasonic pulse fm− at the time t5. Thus, since the intruding fundamental components are the same and of opposite phases, they are canceled out, thereby providing a good harmonic image.

Fifth Embodiment

Figure 11:
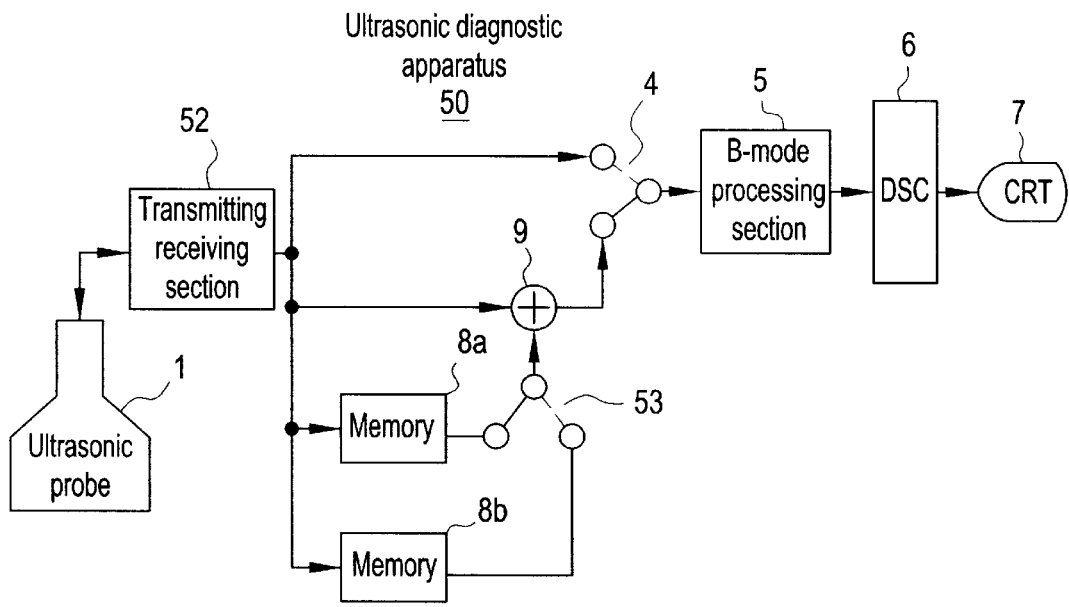
FIG. 11 is a configuration diagram showing an ultrasonic diagnostic apparatus in accordance with a fifth embodiment.

FIG. 11 is a configuration diagram showing an ultrasonic diagnostic apparatus in accordance with a fifth embodiment.

The ultrasonic diagnostic apparatus 50 comprises an ultrasonic probe 1, a transmitting/receiving section 52 for driving the ultrasonic probe 1 to transmit an ultrasonic pulse into a subject and receive an ultrasonic echo from the subject to output received data, a memory 8a for storing first received data corresponding to a first ultrasonic pulse for a certain acoustic line, a memory 8b for storing first received data corresponding to a first ultrasonic pulse for another acoustic line, a selector 53 for selecting from among the memories 8a and 8b, an adder for acquiring harmonic-mode data by adding second received data corresponding to a second ultrasonic pulse of a phase opposite to that of the first ultrasonic pulse, and a first received data selected by the selector 53, a mode switching section 4 for switching between a B mode and a harmonic mode, a B-mode processing section 5 for generating image data from the received data or harmonic-mode data, a DSC 6 for generating image display data, and a CRT 7 for displaying an image.

The imaging timing when the B mode is selected at the mode switching section 4 is the same as that in FIG. 2 (first embodiment).

Figure 12:
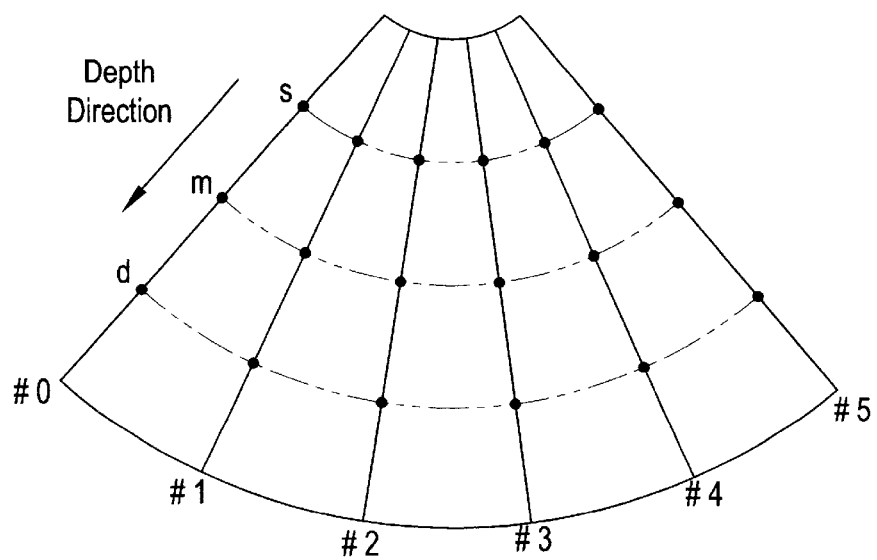
FIG. 12 is a diagram for explaining acoustic lines constituting a frame and foci on the acoustic lines.
Figure 15:
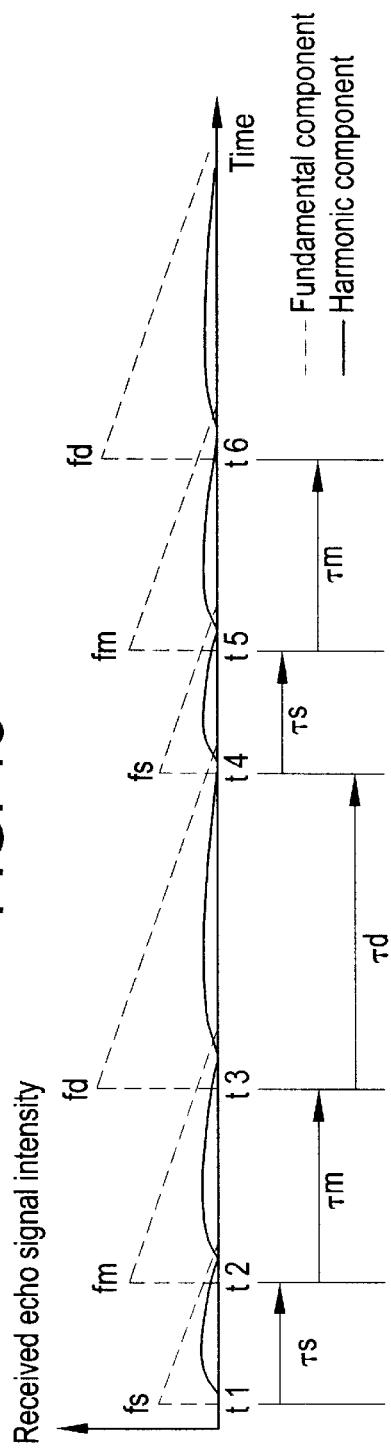
FIG. 15 is a timing chart showing the operation in a harmonic mode according to a filtering technique in the conventional ultrasonic diagnostic apparatus.
Figure 16:
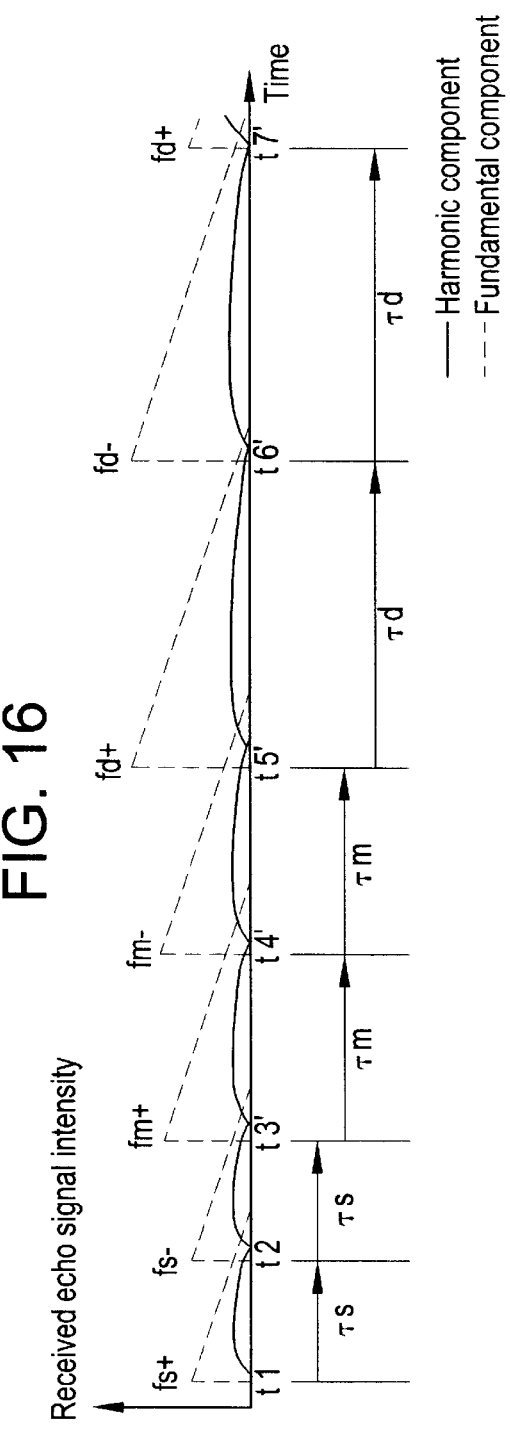
FIG. 16 is a timing chart showing the operation in a harmonic mode according to a phase inversion technique in the conventional ultrasonic diagnostic apparatus.

FIG. 12 is a conceptual diagram of acoustic lines constituting one frame.

It is assumed that one acoustic line is acquired by an ultrasonic pulse fs with a shallow focus, an ultrasonic pulse fm with an intermediate focus, and an ultrasonic pulse fd with a deep focus, and one frame is formed by acoustic lines #0–#5 in different directions.

FIG. 13 is an explanatory diagram showing imaging timing when a harmonic mode is selected at the mode switching section 4.

When a first ultrasonic pulse #0fs+ with a relatively shallow focus on the acoustic line #0 is transmitted at a time t1, the fundamental component of received data indicated by the broken line in FIG. 13 has an intensity decreasing over time with a maximum at the time t1. The harmonic component of the received data indicated by the solid line has an intensity rapidly decreasing over time with a maximum slightly after the time t1.

A time t2 is after a time period τs from the time t1 as in the B mode.

When a first ultrasonic pulse #3fs+ with a relatively shallow focus on the acoustic line #3 is transmitted at the time t2, the fundamental component of received data indicated by the broken line in FIG. 13 has an intensity decreasing over time with a maximum at the time t2. The harmonic component of the received data indicated by the solid line has an intensity rapidly decreasing over time with a maximum slightly after the time t2.

The time period τs from the time t1 to the time t2 is the same as that in the B mode in spite of the larger fundamental component. However, since the acoustic lines #0 and #3 are in different directions, even if the fundamental component for the ultrasonic pulse #0fs+ intrudes into the fundamental component for the ultrasonic pulse #3fs+, it is at a negligible degree.

A time t3' is after a time period τs from the time t2.

When a second ultrasonic pulse #0fs− with a relatively shallow focus on the acoustic line #0 and of a phase opposite to that of the first ultrasonic pulse #0fs+ is transmitted at the time t3', the fundamental component of received data indicated by the broken line in FIG. 13 has an intensity decreasing over time with a maximum at the time t3'. The harmonic component of the received data indicated by the solid line has an intensity rapidly decreasing over time with a maximum slightly after the time t3'.

The time period τs from the time t2 to the time t3' is the same as that in the B mode in spite of the larger fundamental component. However, since the acoustic lines #0 and #3 are in different directions, even if the fundamental component for the ultrasonic pulse #3fs+ intrudes into the fundamental component for the ultrasonic pulse #0fs−, it is at a negligible degree.

A time T4' is after a time period τs from the time t3'.

When a second ultrasonic pulse #3fs− with a relatively shallow focus on the acoustic line #3 and of a phase opposite to that of the first ultrasonic pulse #3fs+ is transmitted at the time T4', the fundamental component of received data indicated by the broken line in FIG. 13 has an intensity decreasing over time with a maximum at the time T4'. The harmonic component of the received data indicated by the solid line has an intensity rapidly decreasing over time with a maximum slightly after the time T4'.

The time period τs from the time t3' to the time T4' is the same as that in the B mode in spite of the larger fundamental component. However, since the acoustic lines #0 and #3 are in different directions, even if the fundamental component for the ultrasonic pulse #0fs− intrudes into the fundamental component for the ultrasonic pulse #3fs−, it is at a negligible degree.

A time T5' is after a time period τs from the time T4'.

When a first ultrasonic pulse #0fm+ with a relatively intermediate focus on the acoustic line #0 is transmitted at the time T5', the fundamental component of received data indicated by the broken line in FIG. 13 has an intensity decreasing over time with a maximum at the time T5'. The harmonic component of the received data indicated by the solid line has an intensity rapidly decreasing over time with a maximum slightly after the time T5'.

The time period τs from the time T4' to the time T5' is the same as that in the B mode in spite of the larger fundamental component. However, since the acoustic lines #0 and #3 are in different directions, even if the fundamental component for the ultrasonic pulse #3fs– intrudes into the fundamental component for the ultrasonic pulse #0fm+, it is at a negligible degree.

A time T6' is after a time period τm from the time T5'.

When a first ultrasonic pulse #3fm+ with a relatively intermediate focus on the acoustic line #3 is transmitted at the time T6', the fundamental component of received data indicated by the broken line in FIG. 13 has an intensity decreasing over time with a maximum at the time T6'. The harmonic component of the received data indicated by the solid line has an intensity rapidly decreasing over time with a maximum slightly after the time T6'.

The time period τm from the time T5' to the time T6' is the same as that in the B mode in spite of the larger fundamental component. However, since the acoustic lines #0 and #3 are in different directions, even if the fundamental component for the ultrasonic pulse #0fm+ intrudes into the fundamental component for the ultrasonic pulse #3fm+, it is at a negligible degree.

A similar operation is repeated thereafter.

Adding the first and second received data at the adder 9, the fundamental components are canceled out because their phases are opposite, and the harmonic components are doubled because they are in phase. That is, solely the harmonic components can be obtained.

In the phase inversion technique shown in FIG. 13, since a current ultrasonic pulse is transmitted to a focus on an acoustic line in a different direction such that the fundamental component of received data for a previous ultrasonic pulse can be neglected, harm due to intrusion is prevented, thus providing a good harmonic image.

Many widely different embodiments of the invention may be constructed without departing from the spirit and the scope of the present invention. It should be understood that the present invention is not limited to the specific embodiments described in the specification, except as defined in the appended claims.

What is claimed is:

1. An ultrasonic diagnostic apparatus comprising:
   an ultrasonic probe;
   a transmitting/receiving device for driving said ultrasonic probe to transmit an ultrasonic pulse into a subject and receive an ultrasonic echo from the subject to output received data;
   a harmonic-mode data generating device for acquiring harmonic-mode data employing a harmonic component from said received data;
   an image producing device for producing a harmonic-mode image based on said harmonic-mode data; and
   a display device for displaying said harmonic-mode image,
   wherein said transmitting/receiving device transmits, after transmitting an ultrasonic pulse to a focus on a certain acoustic line, a next ultrasonic pulse at a time interval such that no effect is received from an ultrasonic echo associated with said former ultrasonic pulse.

2. The ultrasonic diagnostic apparatus of claim 1, wherein said transmitting/receiving device sequentially transmits said first ultrasonic pulse to a plurality of foci on the same acoustic line, and then sequentially transmits said second ultrasonic pulse to the plurality of foci on the same acoustic line.

3. The ultrasonic diagnostic apparatus of claim 1, wherein said transmitting/receiving device conducts, between the transmission of said first ultrasonic pulse and the transmission of said second ultrasonic pulse to a certain focus, transmission of said first or second ultrasonic pulse to one or more foci on one or more other acoustic lines.

4. The ultrasonic diagnostic apparatus of claim 1, wherein said transmitting/receiving device shortens the time between transmission of an ultrasonic pulse and transmission of a next ultrasonic pulse as a corresponding focus is shallower.

5. The ultrasonic diagnostic apparatus of claim 1, wherein said transmitting/receiving device makes the transmission interval of ultrasonic pulses in a B mode shorter than the transmission interval of ultrasonic pulses in a harmonic mode for the same focus.

6. The ultrasonic diagnostic apparatus of claim 1, wherein said transmitting/receiving device makes the transmission interval of ultrasonic pulses in a harmonic mode equal to the transmission interval of ultrasonic pulses in a B mode for the same focus.

7. An ultrasonic diagnostic apparatus comprising:
   an ultrasonic probe;
   a transmitting/receiving device for driving said ultrasonic probe to transmit an ultrasonic pulse into a subject and receive an ultrasonic echo from the subject to output received data;
   a harmonic-mode data generating device for acquiring harmonic-mode data employing a harmonic component from said received data;
   an image producing device for producing a harmonic-mode image based on said harmonic-mode data; and
   a display device for displaying said harmonic-mode image,
   wherein said transmitting/receiving device transmits, after transmitting an ultrasonic pulse to a focus on a certain acoustic line, a next ultrasonic pulse to a focus on an acoustic line spaced apart to a degree such that an ultrasonic pulse associated with said former ultrasonic pulse is negligible.

8. The ultrasonic diagnostic apparatus of claim 7, wherein said transmitting/receiving device sequentially transmits said first ultrasonic pulse to a plurality of foci on the same acoustic line, and then sequentially transmits said second ultrasonic pulse to the plurality of foci on the same acoustic line.

9. The ultrasonic diagnostic apparatus of claim 7, wherein said transmitting/receiving device conducts, between the transmission of said first ultrasonic pulse and the transmission of said second ultrasonic pulse to a certain focus, transmission of said first or second ultrasonic pulse to one or more foci on one or more other acoustic lines.

10. The ultrasonic diagnostic apparatus of claim 7, wherein said transmitting/receiving device shortens the time between transmission of an ultrasonic pulse and transmission of a next ultrasonic pulse as a corresponding focus is shallower.

11. The ultrasonic diagnostic apparatus of claim 7, wherein said transmitting/receiving device makes the transmission interval of ultrasonic pulses in a B mode shorter than the transmission interval of ultrasonic pulses in a harmonic mode for the same focus.

12. The ultrasonic diagnostic apparatus of claim 7, wherein said transmitting/receiving device makes the transmission interval of ultrasonic pulses in a harmonic mode equal to the transmission interval of ultrasonic pulses in a B mode for the same focus.

13. An ultrasonic diagnostic apparatus comprising:

an ultrasonic probe;

a transmitting/receiving device for driving said ultrasonic probe to transmit an ultrasonic pulse into a subject and receive an ultrasonic echo from the subject to output received data;

a harmonic-mode data generating device for acquiring harmonic-mode data based on a sum of first received data corresponding to a first ultrasonic pulse and second received data corresponding to a second ultrasonic pulse of a phase opposite to said first ultrasonic pulse;

an image producing device for producing a harmonic-mode image based on said harmonic-mode data; and a display device for displaying said harmonic-mode image, wherein said transmitting/receiving device transmits, after transmitting said first ultrasonic pulse, said second ultrasonic pulse at a time interval such that said second ultrasonic echo is not affected by said first ultrasonic pulse.

14. The ultrasonic diagnostic apparatus of claim 13, wherein said transmitting/receiving device sequentially transmits said first ultrasonic pulse to a plurality of foci on the same acoustic line, and then sequentially transmits said second ultrasonic pulse to the plurality of foci on the same acoustic line.

15. The ultrasonic diagnostic apparatus of claim 13, wherein said transmitting/receiving device conducts, between the transmission of said first ultrasonic pulse and the transmission of said second ultrasonic pulse to a certain focus, transmission of said first or second ultrasonic pulse to one or more foci on one or more other acoustic lines.

16. The ultrasonic diagnostic apparatus of claim 13, wherein said transmitting/receiving device shortens the time between transmission of an ultrasonic pulse and transmission of a next ultrasonic pulse as a corresponding focus is shallower.

17. The ultrasonic diagnostic apparatus of claim 13, wherein said transmitting/receiving device makes the transmission interval of ultrasonic pulses in a B mode shorter than the transmission interval of ultrasonic pulses in a harmonic mode for the same focus.

18. The ultrasonic diagnostic apparatus of claim 13, wherein said transmitting/receiving device makes the transmission interval of ultrasonic pulses in a harmonic mode equal to the transmission interval of ultrasonic pulses in a B mode for the same focus.

* * * * *